Patented Aug. 24, 1937

2,090,932

UNITED STATES PATENT OFFICE 2,090,932

CLEANING COMPOSITION

Elizabeth Blessing, New York, N. Y.

No Drawing. Application July 17, 1935
Serial No. 31,861

2 Claims. (Cl. 87—5)

This invention relates to a composition of matter for cleansing either organic or inorganic matter, and particularly relates to powder-formed and liquid cleansers.

One of the objects of the present invention is the process of compounding an extremely effective, inexpensively producible composition for cleansing metals, stone, glass, wood, rubber and even human tissue without injury, and the product obtained through the aforesaid process.

Another object of my invention is to so produce the cleansing compound as to enhance its qualities and prevent its deterioration for practically unlimited time.

The foregoing and still other objects and advantages of my invention will become more fully apparent from the following description.

My composition consists principally of pure, finely pulverized ash from anthracite coal, and contains various re-agents which are intended to influence the minutest particles of the ash so as to increase their detergent qualities to the maximum. I have found by experimentation that when I subject clean anthracite coal ash to the influence of a solution containing water, sodium-chloride, quicklime, sal ammoniac and alum in certain proportions, the cleansing qualities of the ash are greatly enhanced, by the formation of sodium hydroxid (NaOH), by the combination of quicklime with sodium chloride (NaCl), to which sal ammoniac and alum are added. Sal ammoniac enhances the penetrating qualities of the composition, while alum increases its "cutting" qualities.

After having washed the ash with the above mentioned solution, I permit the ash to dry and mix the dry ash with a powdered dry mixture of alumina, oxide of tin, oxide of magnesium and rotten stone. All these four aforementioned ingredients have the tendency of smoothening the quality of the cleanser.

The solution, to the influence of which the ash is first subjected, itself formed an excellent cleanser for glassware, jewelry, and other fine highly polished articles, it being clearly seen that after the ash has been washed with the solution, the solution will contain a proportion of potash, which will add to the cleansing quality of the solution.

Going now into the details of the manufacture of my cleansers, I have found the following process most effective. Anthracite coal ash is first sifted so as to eliminate slack, coarse grit, unburnt coal, coke and solid minimum matter, such as kieselguhr (flint or siliceous substances) which impurities, when not eliminated, would damage the surfaces to be cleansed. When the ash is thus deprived of the undesirable content, it is now rolled or milled into a fine powder, which may be screened to different finenesses prior to washing, or may be washed first in bulk and screened after being washed.

Now I prepare a solution of about 150 parts of water, 5 parts of sodium chloride and 5 parts of quicklime. These two ingredients are mixed in the water first and produce, as said before, sodium hydroxid in a weak solution. To this solution is then added two parts of sal ammoniac and three parts of alum, and the whole mixture is preferably boiled until the alum is completely dissolved. The ash may be now washed with the hot solution, or the solution may be cooled off first and the washing may take place then.

The volume of the solution, in either case, has to correspond to the volume of the powdered ash. When hot water is used, a "floating foam" is formed at the top surface of the mixture, which may be skimmed off and dried and treated separately from the remaining residue in the solution. The ash is now vigorously stirred so that the solution penetrates every part of the powdered ash, and then the ash is permitted to settle and to stay for at least one day, but preferably four to five days, so that all the ingredients in the solution penetrate the ash.

Now the watery portion of the solution is poured off and the residue is permitted to dry. When completely dried, I add to the treated ash a finely powdered dry composition of the following ingredients: Alumina, oxide of tin, oxide of magnesium and rotten stone, compounded in equal proportions. The entire mixture of these four ingredients is now mixed with the dried ash in the following proportion: one part of the combined powdered ingredients mixture and ten parts of ash.

After thoroughly mixing the entire dry composition, the ash is now screened to various finenesses.

The "foam" or the floating portion of the ash may be treated with a similar composition of powdered ingredients, which, of course, have to be ground to the very finest powder before being mixed with the "foam". The dry "foam" mixed with the ingredients in the same proportion of one part of the ingredients and 10 parts of the foam, will result in a very fine cleanser, particularly adapted for rare metals and jewelry, or any highly polished hard surface.

Inasmuch as the residue ash, when dried and mixed with the powdered ingredients stated above, may be screened to any fineness, it may be employed for cleansing various articles. A powder produced by screening the ash mixture through a 350 to 400 screen mesh, will be excellent for polishing surfaces of rare metals, chromium, nickel, glass and crystal. A product produced by screening it through a 150 to 250 mesh will be advantageously employed in polishing brass, copper or any other softer metals, and may also be used for cleansing steel.

A coarser powder produced by passing the residue through 50 to 90 mesh can be used for household use in the kitchen for scouring pots and pans.

The liquid solution, used in pre-treating the ash, absorbs, as said before, a portion of the potash contained in the ash and serves admirably for cleansing of cut stones, such as jewelry and glass. It is excellent for cleansing windows.

When for the pre-treatment of the ash a cold solution is used, hardly any of the "floating foam" will be produced. On the other hand, the fine particles remaining in the ash residue will enhance the qualities of the latter in the final mixture.

While I am aware of the existence of cleansers employing hard coal ash, I honestly believe that in none of the cleansers the ash is being pre-treated and handled in the manner indicated, nor do I know of any ash cleanser, in either liquid or powder form having the same or similar composition, which is as effective and as readily applicable to the most divergent uses as is the cleanser of my invention. Neither do I know of any cleansers, with which not only inorganic, mineral and organic objects may so thoroughly be cleansed without damage to such objects, but which may be applied even to human tissue without injuring it. Furthermore, my cleanser has practically no odor, nor is it poisonous.

Having thus described my invention, what I wish to cover by Letters Patent of the United States is the following:

I claim:

1. The process of producing a cleaning composition consisting of sifting anthracite coal ash to remove coarse material such as slack, grit, coal and the like therefrom, reducing the sifted ash to a fine powder, preparing a hot alkaline solution comprising a mixture of water, sodium chloride and quicklime and adding thereto sal ammoniac and alum and boiling until the alum is dissolved, washing the ash with the hot mixture, removing floating "foam" which forms on the surface of the mixture, drying the foam, and adding to the dry foam a finely powdered dry mixture consisting of equal parts of alumina, oxide of tin, oxide of magnesium and rotten stone in the proportion of one part of mixture to ten parts of the dried "foam".

2. The process of producing a cleaning composition as set forth in claim 1 wherein the alkaline solution consists of 150 parts of water, 5 parts of sodium chloride and 5 parts of quicklime mixed together and then having mixed therewith 2 parts of sal ammoniac and 3 parts of alum, the volume of said solution being equal to the volume of ash.

ELIZABETH BLESSING.